Patented Jan. 5, 1937

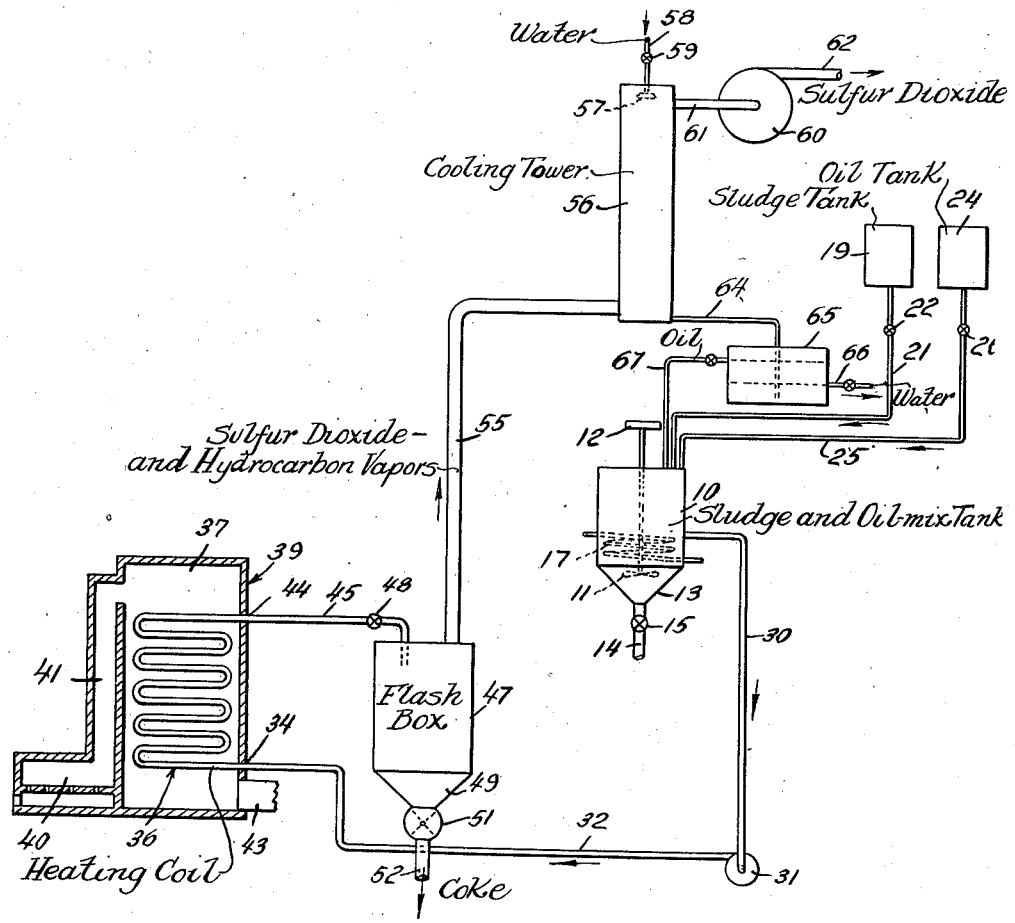

2,066,562

UNITED STATES PATENT OFFICE 2,066,562

PRODUCTION OF SULPHUR DIOXIDE

Theodore V. Fowler, Pelham, N. Y., assignor to General Chemical Company, New York, N. Y., a corporation of New York Application December 5, 1933, Serial No. 700,981

10 Claims. (Cl. 23—177)

This invention relates to methods for the production of gas mixtures rich in sulphur dioxide, and is more particularly directed to the formation of sulphur dioxide from acid sludges, as for example, the sludges comprising waste products of oil refining processes in which sulphuric acid is employed.

Acid sludges contain relatively large quantities of sulphuric acid, free or in combination. An acid sludge of this nature presents problems both with respect to disposal of the sludge where an attempt is made to recover the acid content thereof, and also in connection with the provision of satisfactory processes for separating and recovering sulphur compounds from the sludge. Numerous processes have been suggested for treating acid sludges for the separation and recovery of sulphuric acid as such. Other proposals have been directed to the recovery from acid sludges of sulphur compounds as sulphur dioxide, and the subsequent utilization of the same, as for example, in the production of sulphuric acid.

The present invention contemplates the recovery of sulphur compounds from acid sludges by decomposing sludge by heating with the formation of a gas mixture rich in sulphur dioxide, and the production of solid carbonaceous residue. Decomposition of acid sludges by heat treatments have heretofore been proposed. Prior methods of decomposing acid sludge for the recovery of sulphur dioxide and production of coke involve, as a rule, the use of various types of retorts or kilns, generally externally heated and adapted to receive a substantial body of sludge. As known, acid sludges are quite corrosive because of the relatively large quantities of the free or combined sulphuric acid contained therein. On account of the acid content of the sludges and the appreciably high temperatures at which decomposition is carried out, wear and tear on equipment is in many instances excessive, and parts of the apparatus utilized are comparatively short lived. Furthermore, most prior methods for decomposing sludges, for example those effected in externally heated retorts in the known manner, have been of such nature that in many cases the insulating effect of the body of coke formed has interfered with heat transfer to material in the inner parts of the mass of coke and partly decomposed acid sludge still undergoing decomposition.

With some of the foregoing factors in view, it has been proposed to decompose acid sludges by introducing acid sludge into a body of relatively heavy oil, heating the sludge to temperatures sufficient to decompose the sludge, and then separating the gases and carbonaceous residue formed from the oil. The present invention relates to an improvement on methods of this nature for decomposing acid sludges.

One object of the invention lies in the provision of a preferably continuous process for the decomposition of acid sludges carried out in such manner that the corrosive sludges while in the heated state during decomposition do not, in any substantial quantities, or in undiluted form, come in contact with heated metal of the decomposing apparatus. Another object of the invention contemplates a method according to which the insulating effect of coke formed during decomposition does not impede heat transfer to the undecomposed acid sludge materials in the decomposition zone. Further, in carrying out the process acid sludges may be decomposed in such manner as to produce relatively small amounts of carbon dioxide, thus facilitating the ultimate production of a gas mixture containing principally sulphur dioxide and comparatively small amounts of carbon dioxide and water vapor. With respect to decomposition of acid sludges by a method involving heating the sludge to decomposition temperatures in the presence of a body of oil, and subsequent separation from the oil of the gases and solid carbonaceous residue formed, the invention contemplates particularly improvements relative to separation of oil and solid carbonaceous residue.

Briefly outlined, one preferred embodiment of the process of the invention includes decomposition of acid sludge by heating a mixture of acid sludge and oil, preferably a hydrocarbon oil having a relatively low vaporization point, to temperatures sufficient to decompose the acid sludge. The heating operation is desirably so conducted that, during decomposition of the sludge, the oil is maintained in the liquid phase. Subsequent to decomposition of the acid sludge, the oil is vaporized, for example by reduction of pressure, to facilitate separation of oil and solid carbonaceous residue and to provide for the recovery of carbonaceous residue substantially free from oil. The gaseous and vaporous products formed by the decomposition of the sludge, and the vaporized oil are treated for recovery of the oil, and for the production of a concentrated sulphur dioxide gas mixture.

In carrying out one preferred embodiment of the improved process, a mixture is formed of acid sludge material and a relatively light hydrocarbon oil, preferably an oil vaporizing at temperatures less than the decomposition temperature of the acid sludge being treated. The mixture is pumped through a pipe coil still, and acid sludge material is heated therein to temperatures not less than the decomposition temperature thereof, under conditions of pressure sufficient to maintain the oil primarily in the liquid phase. The products of decomposition of the sludge together with the oil are then discharged into a flash box operated at reduced pressures, and the gases and vapors of the decomposition of the sludge are separated from the solid carbonaceous residue, and at the same time, because of the release of pressure and the contained heat of the oil, the oil is volatilized and separated from the solid carbonaceous residue. By vaporization of the oil in this manner, the coke may be withdrawn from the flash box in a relatively dry condition, containing a minimum amount of oil. The gas mixture including the gases and vapors formed by decomposition of the sludge and the vaporized oil is withdrawn from the flash box, and cooled to separate condensable vapors out of the gas mixture. By this procedure there is produced a concentrated sulphur dioxide gas mixture, and condensed oil which is returned to the process.

The accompanying drawing shows diagrammatically, partly in section, a form of apparatus in which the process of the invention may be advantageously carried out.

Referring to the drawing, the reference numeral 10 indicates a mix tank having therein an agitator 11, driven through pulley 12 from a suitable source of power not shown. Tank 10 is closed at the top, and is provided with a funnel-shaped bottom 13 opening in an outlet pipe 14, having a control valve 15. If desired, a heating coil 17, having suitable inlet and outlet connections for heating medium, may be positioned within the mix tank to maintain the contents thereof in fluid condition. Acid sludge from supply tank 19 may be run into the mix tank through a pipe 21 controlled by valve 22. A similar supply tank 24, for oil used in the process, is likewise connected to tank 10 through pipe 25 having a control valve 26.

Opening into the side of tank 10 is a conduit 30 connected to the inlet side of pump 31, the pressure side of which communicates through pipe 32 with the inlet end 34 of a pipe coil still, indicated generally by reference numeral 36, disposed in the heating chamber 37 of furnace 39. The latter is built to include a combustion chamber 40 in which may be burned coal, coke, oil, gas or other suitable fuel. The uptake 41 of the combustion chamber opens into the upper end of the heating chamber, and hot gases pass downwardly and contact with the exterior of the heating coil, spent gases leaving the furnace through stack 43.

The outlet end 44 of the pipe coil still is connected to a pipe 45 opening into the upper end of a flash box 47, providing a separation zone. Near the outlet end of pipe 45, but outside the flash box, is a valve 48 by which the pressure in the pipe coil still 36 may be regulated. The flash box is a closed, preferably cylindrical vessel having a hopper-like bottom 49 opening into an airlock, indicated at 51, by means of which solid material may be discharged from the flash box through outlet 52 without admitting air into the flash box.

Communicating with the top of the flash chamber is a gas line 55 connected at the opposite end with the base of a cooling tower 56. The latter is preferably an elongated cylindrical vessel having at the upper end thereof a spray head 57 on the end of a cooling liquid inlet pipe 58 controlled by valve 59. Gases are withdrawn from the flash box 47, through pipe 55 and cooling tower 56 by a blower 60, the inlet side of which communicates through pipe 61 with the top of the cooling tower. Reference numeral 62 indicates a pipe, attached to the pressure side of the blower, through which pipe gas produced in the process may be conducted to the point of use.

Cooling liquids and condensates run out of the bottom of cooling tower 56 through a pipe 64 into a separating tank 65 in which separation of oils and water is effected. Water may be drawn off from the separator through pipe 66 and turned to waste or recirculated through tower 56, and the oils separated from the water flow through pipe 67 back into the mix tank 10.

One preferred embodiment of the process may be carried out in the apparatus described substantially as follows:

Compositions of acid sludges vary. One representative sludge had a titratable acidity of 50.8% expressed as $H_2SO_4$, and yielded on decomposition by destructive distillation 28% residual coke, and a retort gas mixture which after cooling produced 6% condensable oils and 36% water, the balance of the gas mixture comprising sulphur dioxide, carbon monoxide, carbon dioxide, nitrogen, water vapor and uncondensable hydrocarbons. A supply of acid sluge of such or similar composition may be maintained in the sludge tank 19, the sludge being fed thereto from a source of supply through pipe connections not shown.

The invention contemplates the use of an oil, preferably a low boiling hydrocarbon oil, which is liquid at relatively low temperatures and which may be substantially completely vaporized, at normal pressures, at relatively slightly higher temperatures. Generally, oils, such as hydrocarbon oils, which are liquid at temperatures in the neighborhood of about 200° F., and which may be vaporized, at normal pressures, at temperatures of about 250–350° F., are suitable for use in the process. The proportions of the sludge and oil in the mix tank may be advantageously regulated, in accordance with the nature of the sludge, so that the resulting mass is fluid and may be readily pumped. Ordinarily, it is not desirable to use more oil than is necessary to provide an adequate carrying medium for the sludge through the pipe coil still. To aid in producing a readily flowable mass in the mix tank, heating medium may be circulated through coil 17 if desired.

The mixture of acid sludge and oil is continuously withdrawn from tank 10 through line 30 by pump 31, and forced through pipe 32 into the inlet end of pipe coil still 36 in furnace 39. The furnace burners are regulated so as to heat the sludge material during passage through the coils of the pipe still to temperatures not less than the decomposition temperature of the particular sludge undergoing treatment. As a general rule, most sludges may be decomposed by heating to temperatures not less than about 350–400° F. Ordinarily, it is preferred to heat the sludge material in the pipe coil still to temperatures not less than about 400° F. Valve 48 in pipe 45 is regulated so as to create pressures in the pipe coil still sufficient to maintain the oil, of the oil-acid sludge mixture, while in the pipe coil still preferably in the liquid phase, such adjustment of valve 48 being dependent upon the vaporization point of the particular oil being used.

Destructive distillation of acid sludges by heating involves principally the reduction of sulphuric acid by the hydrogen of hydrocarbons and/or by the carbonaceous matter contained in the sludge with the production of sulphur dioxide and petroleum coke. On heating the mixture in the pipe coil still to temperatures above the decomposition point of the acid sludge, the acid sludge is decomposed producing principally sulphur dioxide gas and water vapor, and solid carbonaceous residue.

Once decomposition of the sludge material has been effected in the pipe coil still, with respect to the products of decomposition of the sludge, it is generally immaterial whether temperatures are thereafter maintained above the decomposition temperature of the particular acid sludge. However, in order to fully accomplish the purposes of the invention, the temperature in the heating chamber 37 should also be regulated so as to provide the proper temperature in the oil at the time the mixture of oil and decomposition products of the acid sludge passes through the regulating valve 48. As the oil employed is preferably one which vaporizes at temperatures less than the decomposition temperature of the acid sludge, it will be seen that, by heating the acid sludge material to or above decomposition temperature in the pipe coil still, the body of carrying oil is also heated to temperatures above the vaporization point (at normal pressure), and that the oil is maintained in the liquid phase while in the pipe coil still by reason of regulation of valve 48. To obtain the advantages of the process of the invention, heating should be preferably conducted in the pipe still so that the temperature of the oil at valve 48 should be such that the oil will be vaporized in the flash chamber.

On entering the separation zone in flash chamber 47, preferably maintained at about normal pressure or below, the gases and vapors, such as sulphur dioxide, water vapor, small amounts of carbon dioxide, carbon monoxide, nitrogen, etc. formed by decomposition of the sludge material in the pipe still, are immediately separated from the solid carbonaceous residue, produced by decomposition of the sludge, which residue drops to the bottom of the flash box. On account of the reduction of pressure, the oil, which was in a liquid condition prior to passing valve 48, is vaporized and is withdrawn, together with the sulphur dioxide and other gases and vapors formed by decomposition of the sludge, by blower 60 from the flash chamber and introduced into the base of cooling tower 56. Owing to the vaporization of the oil in the flash chamber, the solid carbonaceous residue is separated from the oil and drops into the hopper-shaped bottom 49. The coke, in a condition containing but little if any oil, may be withdrawn continuously or intermittently from the flash box through air-lock 51, and utilized in the combustion chamber 40 or for other purposes.

The mixture of gases and vapors withdrawn from the flash box 47 by blower 60, containing the gases and vapors produced by decomposition of the acid sludge and substantially all the oil utilized in the process in vapor form, enters the cooling tower at the base and ascends against a downwardly flowing spray of water or other cooling liquid introduced into spray head 57 through inlet 58. The valve 59 is regulated so as to permit introduction into the cooling tower of such quantities of water as may be necessary to cool the gas while passing upwardly through the cooling tower to temperatures of about 100° F., and so that the mixture of cooling liquid and condensates discharged from the bottom of the tower through pipe 64 is at temperatures of about 160° F. to 180° F., at which temperatures a minimum amount of sulphur dioxide is absorbed. Cooling of the mixture of gases and vapors in tower 56 in this manner effects condensation of the bulk of the water vapor and the relatively small amount of hydrocarbon vapors formed by the decomposition of the sludge, and also condensation of the oil vapors utilized in making up the mixture of oil and acid sludge in tank 10. Since decomposition of the acid sludge is carried out substantially in the absence of air or other diluting gases, and as the greater part of the mixture entering the base of cooling tower 56, other than sulphur dioxide, comprises condensable vapors which are separated from the sulphur dioxide in the cooling tower, the gas stream withdrawn from the upper end thereof is relatively concentrated, and may contain 75–99% sulphur dioxide.

In tank 65, the water and oily condensates from the cooling tower 56 are separated. The water may be discharged to waste through pipe 66, or may be recirculated through tower 56. The oil recovered is returned to the mix tank 10 through pipe 67. In this manner, substantially all of the oil employed for forming the mixture of oil and sludge in tank 10 is recovered and returned to the process.

As above stated, decomposition of acid sludge by heating involves principally the reduction of sulphuric acid by the hydrogen of hydrocarbons and/or by the carbonaceous matter contained in the sludge. Reduction of the sulphuric acid by the hydrogen of hydrocarbons and the carbonaceous matter contained in the sludge appears to be preferential with respect to the hydrogen of the hydrocarbons, that is, it appears that available hydrogen is first utilized to reduce sulphuric acid with the production of sulphur dioxide and water vapor. The latter may be removed from the gas mixture by cooling, thus readily eliminating water vapor and producing a gas mixture having a high sulphur dioxide content. On the other hand, when appreciable quantities of carbonaceous matter of the sludge become involved in reducing the sulphuric acid, carbon dioxide is formed, and as this gas is not removed from the gas stream by subsequent cooling, the carbon dioxide acts as a diluent of the gas mixture, and hence reduces the sulphur dioxide concentration thereof.

According to the present invention, the oils utilized in the decomposition reaction are preferably relatively light hydrocarbon oils. The oils employed in the present method thus contain hydrogen which may, to some extent, be available for the reduction of the sulphuric acid of the acid sludge. Hence, some of the hydrogen of hydrocarbons of the body of carrying oil may, along with hydrogen of the hydrocarbons contained in the sludge, be utilized in the reduction of sulphuric acid, and it appears that little or no carbon enters into the reduction of the sulphuric acid. Accordingly, it will be seen the gaseous products of the reaction, in most instances, contain relatively small amounts of carbon dioxide, and since water and hydrocarbon vapors may be easily condensed out of the gas stream, the ultimate gas mixture obtained after cooling may, for practical purposes, be considered substantially all sulphur dioxide. After cooling of the gas stream and separation therefrom of water and hydrocarbon vapors, the gas mixture may be used directly where a concentrated sulphur dioxide gas is desired, or in other cases, the gases may be further purified if desired, diluted with air, and employed in the manufacture of sulphuric acid.

Heretofore, in the recovery of sulphur values from acid sludge obtained in the treatment of petroleum distillates with sulphuric acid or sulphuric anhydride, the sludge has been treated with steam or water in suitable retorts. This procedure results in the separation of the sludge into an oily mass and a dilute, impure sulphuric acid which settles to the bottom of the treating vessel. In the art, this impure acid has been designated "weak acid" or "sludge acid", and has in some instances been concentrated sufficiently to permit re-use in refining further quantities of petroleum distillates. On the other hand, the term "acid sludge" is generally utilized to define the acid mass obtained directly from the apparatus in which the petroleum distillates have been treated with sulphuric acid. It is to be understood that the present invention is applicable to the decomposition of both acid sludges and sludge acids, and also to the recovery of sulphur dioxide from other impure forms of sulphuric acid.

Generally speaking, sludge acid is more corrosive and hence more destructive to apparatus than acid sludge, because of the relatively higher acid content of the sludge acid and the fact that it is substantially all free acid. Since in the operation of the present method, the materials being decomposed do not, in undiluted condition, directly contact metallic parts of the apparatus, the method of the invention is particularly suited to the decomposition of more corrosive sludge acids. In the latter instance, of course, the amount of coke formed is considerably less than that produced by the destructive distillation of acid sludges, since during the water or steam treatment of acid sludges, considerable quantities of oily matter rise to the top of the batch and are removed and consequently do not appear in the sludge acid. In the appended claims, the term "acid sludge" is intended to include acid sludge and sludge acid, and other impure forms of sulphuric acid.

It is also to be observed that in the operation of the present process, the individual particles of coke or partly formed coke in the body of carrying oil, are each surrounded by hot oil, and in effect, the particles are individually coked. Because of this feature, substantial bodies of coke do not collect on the heat transfer surfaces and interfere with the transmission of heat to the sludge material in the interior of the mass undergoing decomposition.

I claim:

1. The method of decomposing acid sludge which comprises heating a mixture of acid sludge and mineral oil, vaporizable at temperatures not greater than the decomposition temperatures of the sludge and in quantity sufficient to provide a carrying medium for the sludge, to temperatures sufficient to decompose the acid sludge material to produce sulphur dioxide and solid carbonaceous residue while preventing vaporization of the oil, and releasing the heated mixture into a zone of reduced pressure to vaporize the oil to separate oil and solid carbonaceous residue.

2. The method of decomposing acid sludge to produce sulphur dioxide and solid carbonaceous residue which comprises heating a mixture of acid sludge and mineral oil, vaporizable at temperatures not greater than the decomposition temperatures of the sludge and in quantity sufficient to provide a carrying medium for the sludge, to temperatures sufficient to decompose the acid sludge material to produce sulphur dioxide and solid carbonaceous residue while preventing vaporization of the oil, discharging the mixture into a separating zone, vaporizing the oil in said zone to separate oil and carbonaceous residue and withdrawing sulphur dioxide and solid carbonaceous residue from said zone.

3. The method of decomposing acid sludge to produce sulphur dioxide and solid carbonaceous residue which comprises heating a mixture of acid sludge and mineral oil, vaporizable at temperatures not greater than the decomposition temperatures of the sludge and in quantity sufficient to provide a carrying medium for the sludge, to temperatures sufficient to decompose the acid sludge under conditions such as to maintain the oil in the liquid phase, and then vaporizing the oil to separate oil and solid carbonaceous residue.

4. The method of decomposing acid sludge to produce sulphur dioxide and solid carbonaceous residue which comprises heating a mixture of acid sludge and mineral oil, vaporizable at temperatures not greater than the decomposition temperatures of the sludge and in quantity sufficient to provide a carrying medium for the sludge, to temperatures sufficient to decompose the acid sludge under conditions such as to maintain the oil in the liquid phase, and then reducing the pressure to vaporize the oil, and separating gases and vapors from solid carbonaceous residue.

5. The method of decomposing acid sludge to produce sulphur dioxide and solid carbonaceous residue which comprises heating a mixture of acid sludge and mineral oil, vaporizable at temperatures not greater than the decomposition temperatures of the sludge and in quantity sufficient to provide a carrying medium for the sludge, to temperatures sufficient to decompose the acid sludge at elevated pressures sufficient to maintain the oil in the liquid phase, then reducing the pressure to vaporize the oil, and separating gases and vapors from the solid carbonaceous residue.

6. The method of decomposing acid sludge to produce sulphur dioxide and solid carbonaceous residue which comprises forming a mixture of acid sludge and mineral oil, vaporizable at temperatures not greater than the decomposition temperatures of the sludge and in quantity sufficient to provide a carrying medium for the sludge, heating the mixture in a confined space to temperatures sufficient to decompose the acid sludge whereby pressure is created, and then reducing the pressure to separate gases and vapors from solid carbonaceous residue.

7. The method of decomposing acid sludge to produce sulphur dioxide and solid carbonaceous residue which comprises forming a mixture of acid sludge and mineral oil, vaporizable at temperatures not greater than the decomposition temperatures of the sludge and in quantity sufficient to provide a carrying medium for the sludge, continuously passing the mixture through a confined passage, heating the mixture therein to temperatures sufficient to decompose the acid sludge under pressure conditions such as to maintain the oil in the liquid phase, discharging the mixture into a separating zone, vaporizing the oil therein, and separating gases and vapors from solid carbonaceous residue.

8. The method of decomposing acid sludge to produce sulphur dioxide and solid carbonaceous residue which comprises forming a mixture of acid sludge and mineral oil, vaporizable at temperatures not greater than the decomposition temperatures of the sludge and in quantity sufficient to provide a carrying medium for the sludge, continuously passing the mixture through a pipe coil still, heating the mixture therein to temperatures sufficient to decompose the acid sludge under pressure conditions such as to maintain the oil in the liquid phase, discharging the mixture into a zone maintained under reduced pressure to vaporize the oil and to separate sulphur dioxide and solid carbonaceous residue, and separating gases and vapors from solid carbonaceous residue.

9. The method of decomposing acid sludge to produce sulphur dioxide and solid carbonaceous residue which comprises forming a mixture of acid sludge and mineral oil, vaporizable at temperatures not greater than the decomposition temperatures of the sludge and in quantity sufficient to provide a carrying medium for the sludge, heating the mixture to temperatures sufficient to decompose the acid sludge under conditions to maintain the oil in the liquid phase, discharging the heated mixture into a separating zone to separate sulphur dioxide and solid carbonaceous residue, vaporizing the oil in the separating zone, withdrawing vapors and sulphur dioxide gas from the separating zone, and separating sulphur dioxide gas and vapors.

10. The method of decomposing acid sludge to produce sulphur dioxide and solid carbonaceous residue which comprises forming a mixture of acid sludge and mineral oil, continuously passing the mixture through a pipe coil still, heating the mixture therein to temperatures sufficient to decompose the acid sludge under conditions creating pressure sufficient to maintain the oil in the liquid phase, continuously discharging the mixture into a separation zone maintained at reduced pressures to separate sulphur dioxide and solid carbonaceous residue and to effect vaporization of the oil, withdrawing the mixture of vapors and sulphur dioxide from the separation zone, cooling the mixture to separate condensable vapors thereby producing a concentrated sulphur dioxide gas, recovering the oils from the condensate, and discharging solid carbonaceous residue from the separation zone.

THEODORE V. FOWLER.